(12) United States Patent
Webb

(10) Patent No.: US 6,427,348 B1
(45) Date of Patent: Aug. 6, 2002

(54) SLOPE BLOCK

(76) Inventor: James Webb, 3112 Kashiwa St., Torrance, CA (US) 90505-4011

( * ) Notice: Subject to any disclaimer, the term of this patent is extended or adjusted under 35 U.S.C. 154(b) by 0 days.

(21) Appl. No.: 09/617,925

(22) Filed: Jul. 17, 2000

(51) Int. Cl.[7] .............................. G01C 9/00; G01C 5/00
(52) U.S. Cl. .............................. 33/286; 33/365; 33/375; 33/275
(58) Field of Search ........................ 33/286, 263, 275 R, 33/276, 278, 279, 292, 354, 365, 379, 529, DIG. 21, 374, 375, 451

(56) References Cited

U.S. PATENT DOCUMENTS

| 2,877,555 A | * | 3/1959 | Visockis | 33/275 |
| 4,333,242 A | * | 6/1982 | Genho, Sr. | 33/227 |
| 4,543,731 A | * | 10/1985 | Boundy | 33/375 |
| 5,127,167 A | * | 7/1992 | Kennedy | 33/370 |
| 5,519,942 A | * | 5/1996 | Webb | 33/290 |
| 6,133,996 A | * | 10/2000 | Plumb et al. | 33/273 |
| 6,167,630 B1 | * | 1/2001 | Webb | 33/354 |
| 6,195,902 B1 | * | 3/2001 | Jan et al. | 33/286 |
| 6,205,670 B1 | * | 3/2001 | Webb | 33/542 |
| 6,293,024 B1 | * | 9/2001 | Fiebig et al. | 33/375 |

* cited by examiner

Primary Examiner—Diego Gutierrez
Assistant Examiner—Mirellys Jagan
(74) Attorney, Agent, or Firm—Roger A. Maars

(57) ABSTRACT

A slope block assembly having a bubble level with an eccentrically mounted slope block detachably carried on one end of the level. The slope block has an offset turning axis with a plurality of supporting surfaces, all located at different distances from the turning axis. The support surfaces cooperate with an undersurface or support point on the level to direct a laser beam at a desired angle with respect to a round or flat reference surface. Grooves are provided on the slope block support surfaces as well as on the level undersurface to support the level and slope block assembly on a round or curved reference surface.

10 Claims, 1 Drawing Sheet

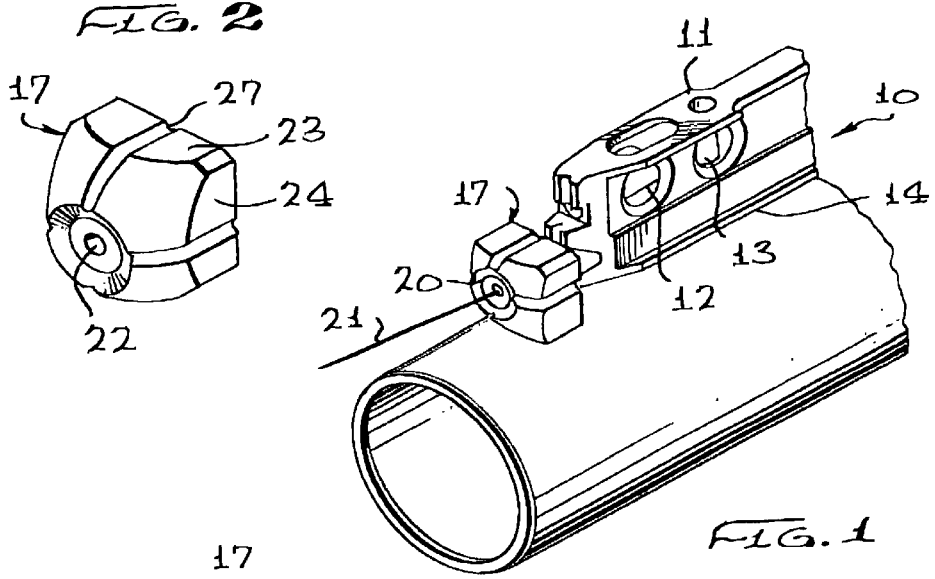
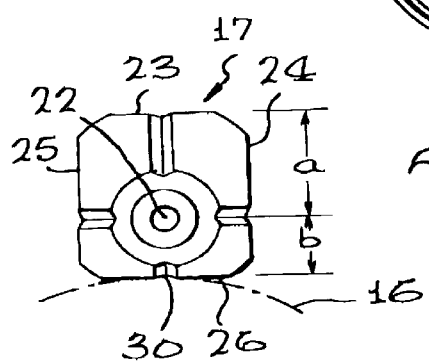
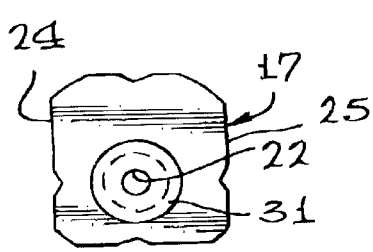
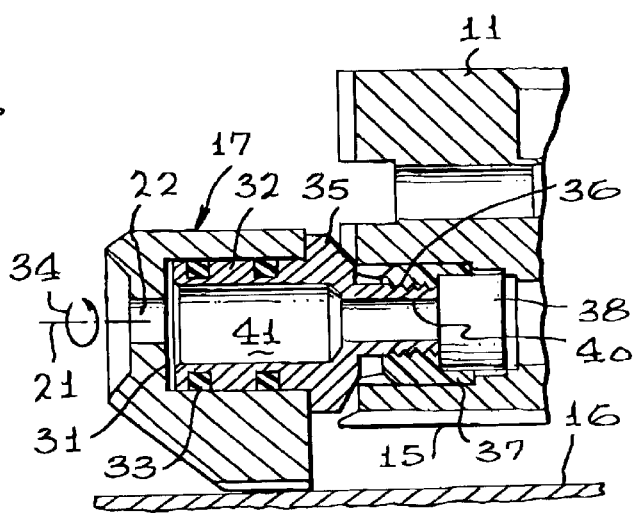

SLOPE BLOCK

BACKGROUND OF THE INVENTION

1. Field of the Invention

The present invention relates to the field of levelling devices, and more particularly to a novel slope block which attaches to a laser level allowing for quick, easy and perfect projection of a laser beam whereby the slope or pitch of the level can readily be selectively adjusted.

2. Brief Description of the Prior Art

In the past, it has been the conventional practice to place a level on a surface in order to project a laser beam in a driven direction so that the beam is properly aligned and in parallel relationship with respect to the surface. At times, it is desirable to elevate one end of the level with respect to the surface for a given number of degrees so that the projected laser beam is angularly disposed with respect to the flat surface on which the level resides. In this selective or adjustment capacity, a plurality of pins or other elements are employed for raising the end of the level a given distance above the flat surface so that the generated laser beam is at a selective angle. However, problems and difficulties have been encountered which are due to the fact that different angles are required and there is no convenient adjustment means available which will permit convenient and rapid angle adjustment with respect to the laser beam and the flat surface on which the level is related.

Therefore, a long-standing need has existed to provide a means attachable to a level so that the generated laser beam can rapidly and conveniently be adjusted with respect to a given referenced surface. Such an angle or slope adjustment means should cooperate with the existing liquid or oil vials so that proper visual angular relationship can be selected.

SUMMARY OF THE INVENTION

Accordingly, the above problems and difficulties are avoided by the present invention which provides a novel slope block assembly with a level having liquid visual slope indicators and which further includes a laser beam generator. The assembly includes a slope block having at least four sides which are flat and which are joined by chamfered corners and which includes a tapered or conical front surface connecting the lateral flat surfaces with a concave recess. An open-ended passageway extends through the block and includes an enlarged receptacle at the rear of the block. A lens adaptor is provided which includes a shank insertably disposed within the receptacle of the block and includes a pair of O-rings for proper fit. A threaded shank is included on the adaptor which engages with internal threads provided in one end of the laser level and the adaptor includes an open-ended passageway coaxially disposed with respect to the passageway in the block to permit passage of a laser beam generated by the laser generator. A major feature of the invention resides in having the ability to rotate the slope block on the adaptor so that a selected flat surface of the block can rest on the flat surface supporting the level itself.

Additionally, the flat surfaces on the block are interrupted by centered grooves so that the supporting surface for the level as well as the block may be round or may be flat.

Therefore, it is among the primary objects of the present invention to assemble a slope block in a rotatable manner on a level so that the user may simply rotate the block to any given of its sides so as to project a laser beam at a desired angle or slope.

Another object resides in providing a slope block assembly with a laser level that allows quick, easy and perfect projection of the laser beam and which cooperates with the liquid level vial of the level to determine slope or pitch from any series of laser levels.

Still another object resides in providing a slope determination system for a laser level whereby a slope block is rotatably carried on one end of the level whereby a system of rotating dimensions can be achieved.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a perspective view showing the novel slope block assembly of the present invention used in connection with a level mounted on a cylindrical reference member such as a pipe;

FIG. 2 is a front perspective view of the slope block incorporating the present invention;

FIG. 3 is a front elevational view of the block shown in FIG. 2;

FIG. 4 is a rear elevational view of the block shown in FIG. 2; and

FIG. 5 is an enlarged longitudinal cross-sectional view of the slope block assembly as shown in FIG. 1.

DESCRIPTION OF PREFERRED EMBODIMENT

Referring to FIG. 1, the novel slope block assembly incorporating the present invention is illustrated in the general direction of arrow 10, which includes an elongated level 11 having tubular indicators 12 and 13 exposed for visual observation in order to determine a desired level of parallelism or a given angle relationship. Each indicator is a tub containing a fluid which is preferably colored so that an observer can readily determine vertical, horizontal or any angular disposition of the fluid. The level also includes an undersurface 14 that is relatively flat so that it may be placed on a flat surface for orientation purposes. However, the surface is also provided with a linear groove shown in FIG. 5 by numeral 15 so that the level can be supported on a round or circular surface such as tube 16. The end of the level 11 mounts a slope block 17 that is available to elevate one end of the level to provide a desired angle for the beam 21. The front face of the block includes a recessed concave cavity 20 and an open ended passageway or bore 22 extending through the block 17. The laser beam 21 passes through the block via the passageway 22.

In FIGS. 2–4 inclusive, the slope block can be seen to include not only an open-ended passageway 22 but further includes four sides identified by top side 23, one side 24 and opposite side 25 and a bottom side 26. Each of the respective sides includes an elongated groove, such as groove 27, through the surface of top 23. The respective grooves on each of the sides are intended to rest on a curved surface such as the exterior surface of pipe 16 so that when used in combination with slot or groove 15, the level and slope block will be stabilized in position during an alignment procedure. For example, a groove 30 in bottom side 26 rests on the surface of the tube 16 and assists in stabilizing the device in position. The various grooves are placed on the sides since the slope block 17 is adapted to be rotated on the end of level 11 so that a selected side of the block can be placed on a referenced surface in the same manner as the underside 14 of the level 11. A feature resides in offsetting the open-ended passage-way 22 with respect to the selected ones of the sides so that a multiplicity of angles and alignments can be achieved. For example, it can be seen that the central longitudinal axis of the passageway 22 is at a distance from top surface 23 represented by the letter a, while the distance between the center line of passageway 22 with respect to the undersurface 26 is represented by b distance.

In reference to FIG. 4, it can be seen that the back of block 17 includes a receptacle 31 adapted to insertably receive a shaft stub upon which the slope block 17 is mounted on the end of level 11.

Referring now in detail to FIG. 5, it can be seen that an adapter having a shaft stud 32 is inserted into the opening or receptacle 31 so as to permit a rotatable mounting of the block 17 on the shaft stud. The stud is provided with O-rings, such as elastromeric ring 30, so that a smooth rotation of the block 17 can be achieved. Rotation of the block is particularly indicated by the circular arrow 34. The stud 32 is attached to a body 35 having a threaded connector 36 adapted to be mounted in a threaded relationship with fitting 37 A laser beam generator 38 is carried on the level 11 and produces a laser beam which travels through passageway 40 in the threaded connector 36 and through an opening 41 in the stud 32 for projection through the opening 22 in the block.

Therefore, it can be seen that the slope block 17 can be rotated to provide a desired dimension necessary to raise one end of the level 11. Depending on the height desired, the block may be rotated so that any one of its four sides can reside on the referenced surface 16. Inasmuch as the distance between the external surface and the opening 22 is different, the selection can be calibrated and the distance determined. Whatever the height desired, will be related to the angle of the beam 21 with respect to the surface of the reference 16. Provision of the grooves 30 associated with each side of the block prevents rolling or slippage of the block and the level from the referenced surface 16.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An adjustable slope leveling device comprising:

an elongated level body having opposite ends with a flat undersurface for supporting said level body;

a laser beam generator carried on a selected end of said opposite ends for emitting a laser beam parallel with said undersurface;

a slope block removably mounted on said selected end of said level body and having an open-ended passageway in coaxial and coextensive alignment with said laser beam;

said slope block having at least two parallel spaced-apart flat surfaces in offset relationship with respect to said passageway whereby a selected one of said flat surfaces cooperates with the non-selected end of said level body to support said level body at an angle with regard to a supporting member;

an adapter detachably coupling said slope block with said level body; and means carried on said adapter for rotating said slope block thereon whereby a selected one of said flat surfaces is positioned to cooperate with said undersurface and said non-selected end to establish said angle.

2. The slope leveling device defined in claim 1 including:

said undersurface having a linear groove extending along its length mid-way between opposite side edges of said undersurface; and a linear groove in each of said slope block flat surfaces selectively locatable to support said slope block on a circular supporting surface.

3. The slope leveling device defined in claim 1 wherein:

said adapter includes an adapter body having a stud outwardly projecting from one side thereof and a threaded fitting outwardly projecting from an opposite side thereof;

said selected end of said level body having a threaded receptacle receiving said threaded fitting;

said slope block having a recess for insertably receiving said stud; and said stud having elastromeric O-rings rotatably supporting and mounting said slope block thereon.

4. The slope leveling device defined in claim 3 wherein:

said adapter body includes a passageway conducting said laser beam from said laser beam generator to said slope block passageway.

5. An adjustable slope leveling device comprising:

an elongated level body having opposite ends with an interconnecting undersurface for supporting said level body;

a laser beam generator mounted on a selected end of said level body for emitting a laser beam parallel with said undersurface;

a slope block having a central longitudinal axis coextensive with said laser beam;

said slope block further having a passageway coaxial with said central longitudinal axis through which said laser beam is conducted;

said slope block further having an upper surface and a lower surface parallel with respect to each other and with respect to said central longitudinal axis;

said upper surface being of a different distance from said central longitudinal axis than a distance of said lower surface from said central longitudinal axis; and means for rotatably coupling said slope block with said selected end of said level body whereby either said upper surface or said lower surface cooperate with said undersurface to support said level body at a given angle.

6. The slope leveling device defined in claim 5 wherein:

said slope block passageway is open-ended and is offset from between said upper and said lower surfaces.

7. The slope leveling device defined in claim 6 wherein:

said coupling means provides an eccentric rotation of said slope block with respect to said selected end of said level body.

8. The slope leveling device defined in claim 7 wherein:

said coupling means is an elongated adapter having a mid-section body with a stud outwardly projecting from a first side thereof and a threaded connector outwardly projecting from a second side thereof; and said slope block carried on said stud and said selected end joined with said threaded connector.

9. The slope leveling device defined in claim 8 including:

a pair of spaced-apart O-rings carried on said stud for rotatably supporting said slope block.

10. The slope leveling device defined in claim 9 wherein:

said selected end of said level body includes a recess occupied by a fitting having a threaded bore for receiving said threaded connector; and said threaded bore and said slope block passageway being coextensive and coaxial for conducting said laser beam therethrough.

* * * * *